April 1, 1952     J. P. ECKERT, JR., ET AL     2,590,950
SIGNAL RESPONSIVE CIRCUIT Filed Nov. 16, 1950     2 SHEETS—SHEET 1

INVENTORS.
John W. Mauchly
John Presper Eckert Jr.

Patented Apr. 1, 1952

2,590,950

UNITED STATES PATENT OFFICE 2,590,950

SIGNAL RESPONSIVE CIRCUIT

John Presper Eckert, Jr., Gladwyne, and John W. Mauchly, Ambler, Pa., assignors to Eckert-Mauchly Computer Corporation, Philadelphia, Pa., a corporation of Pennsylvania Application November 16, 1950, Serial No. 195,954

15 Claims. (Cl. 177—353)

This invention relates to apparatus jointly responsive to signal groups arriving over a plurality of channels and more particularly to a signal responsive network of the type delivering at its output a signal reflecting proporties present in all its input channels.

This invention provides an apparatus responsive to signals or trains of signals which arrive over a plurality of channels. The apparatus does not respond to each signal individually, but to each group of signals delivered concurrently by the several channels. In this way, the apparatus produces a response which is a signal or train of signals uniquely reflecting the properties of the signals or trains of signals arriving over the signal channels.

Accordingly, it is a principal object of the invention to provide a new and improved signal responsive circuit.

Another object of the invention is to provide a new and improved circuit responsive to signal impulse groups made up of impulses concurrently arriving over a plurality of signal channels.

A further object of this invention is to provide a new and improved circuit responsive to signals concurrently present upon three signal input channels.

Yet another object of the invention is to provide a new and improved circuit for producing unique output signals or impulse trains in response to energizing impulse groups.

Still another object of the invention is to provide an impulse responsive circuit delivering timed output impulses or trains of impulses.

A further object of the invention is to provide an impulse responsive circuit having high reliability and accuracy of response.

The foregoing and other objects of the invention will become more apparent as the following detailed description of the invention is read in conjunction with the drawings in which:

In the annexed drawings like parts are identified by like reference characters.

The drawings and descriptions are based on the use of conventional thermionic tubes for the purpose of illustration. However, since any valving device having suitable control properties may be used, the general term "valve" has been employed in the text. Heater circuits for the thermionic cathodes have been omitted, as such circuits are well known in the art, and their addition to the figure might obscure the clarity of presentation of the invention. For the same reason, the details of the direct current power supply or power supplies have been omitted. The voltage requirements at various supply points in the circuit are numerically indicated, even numbers corresponding to the voltage level being used for positive supply voltages and odd numbers corresponding to the voltage level being used for negative supply voltages. It is to be understood that the power supply may include the usual filtering and decoupling arrangements to prevent interaction between the circuits fed from the various taps. Values of voltage are illustrative only and are not to be construed in a limiting sense.

Figure 1:
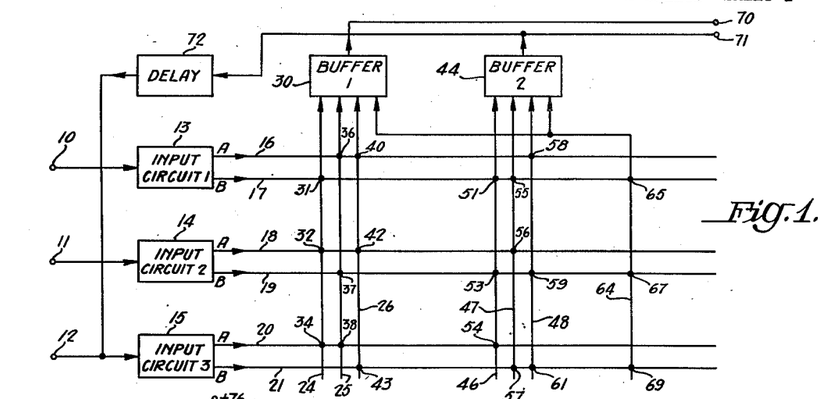
Figure 1 diagrammatically illustrates in block form a signal responsive network embodying the invention.

Referring now to Figure 1 which diagrammatically illustrates in block form a signal responsive network, the apparatus has three input terminals 10, 11, and 12 and two signal output terminals 70 and 71. This circuit is characterized by delivering an output signal from the first output terminal 70 in response to an input signal to any one, but only one, of the signal input terminals 10, 11, and 12. When two concurrent signals are delivered to any two, but only two, of the signal input terminals 10, 11 and 12, the circuit responds by delivering an output signal over the terminal 71. In the case where three concurrent input signals are delivered to the input terminals 10, 11 and 12, output signals are simultaneously delivered over both output terminals 70 and 71.

The signal input terminals 10, 11 and 12 are respectively connected to the input leads of input circuits 13, 14 and 15. The input circuit 13 has two output leads 16 and 17. The output lead 16 is normally excited by the input circuit 13 while its other output lead 17 is normally not excited. However, when an input signal is delivered over the terminal 10, to the circuit 13, excitation is switched from output lead 16 to output lead 17.

In a similar manner, the input circuits 14 and 15 respectively have pairs of output leads 18, 19, and 20, 21. The output leads 18 and 20 respectively of input circuits 14 and 15 are normally excited, while their respective companion leads 19 and 21 are not excited. Excitation of the input circuit 14 by a signal delivered over terminal 11 results in the switching of excitation from its output line 18 to the normally non-excited line 19. Likewise, excitation of the input circuit 15 switches excitation from its output lead 20 to its normally non-excited lead 21.

Three selector lines 24, 25, and 26 each adapted to deliver input signals to a buffer unit 30 are linked by a plurality of connections to the output leads of the input circuits 13, 14 and 15. More specifically, the selector line 24 is joined to the normally non-excited line 17 of input circuit 13 by use of a connection 31, to the normally excited output lead 18 of input circuit 14 by means of a connection 32, and to the normally excited output lead 20 of input circuit 15 through a connection 34.

Selector line 25 is joined by connection 36 to the normally excited lead 16 of input circuit 13, by connection 37 to the normally non-excited lead of input circuit 14, and by connection 39 to the normally excited lead 20 of input circuit 15.

A selector line 26 is joined to the normally excited lead 16 of circuit 13 through connection 40, to the normally excited lead 18 of circuit 14 through a connection 42, and to the normally non-excited lead 21 of circuit 15 through the connection 43.

The connections such as 31, 32, 34, etc., referred to above may be any variety of suitable elements such as resistors, crystal diodes, capacitors, to give but a few examples.

It is noted that each selector line, 24, 25 and 26 is characterized by connecting to one output lead of each of the input circuits 13, 14, and 15 so that each selector line is joined to one normally non-excited output lead and two normally excited output leads, each using a different combination of input circuits.

It is further noted that an input signal can be delivered to the buffer unit 30 by one of the selector lines 24, 25 and 26, only when all three of its connections are linked to excited output leads. It is thus apparent that no signal can be delivered to the buffer unit 30 when none of the input circuits 13, 14, and 15 is excited. However, if one and only one of the input circuits 13, 14 and 15 is excited an input signal will be delivered by the respective selector line 24, 25 and 26 to the input of buffer unit 30.

For example, if input circuit 13 is stimulated by a signal over terminal 10, excitation is switched to the output lead 17 joined with the connection 31 and the selector line 24. The selector line 24 is also connected to the normally excited lines 18 and 20 through respective connections 32 and 34. Thus, each connection 31, 32 and 34 joins the selector line 24 to an excited output lead, causing the selector line 24 to deliver an input signal to the buffer 30. In a similar manner, if the input circuit 14 is the only circuit energized the selector line 25 will deliver an input signal to the buffer unit 30. Correspondingly, the excitation of input circuit 15 over terminal 12 results in the delivery of a signal to buffer unit 30 via the selector line 26. Stimulation of the buffer unit 30 by a selector line input signal results in the delivery of a signal to the output terminal 70.

The output leads of input circuits 13, 14 and 15 are linked by a plurality of connections with three additional selector lines 46, 47 and 48 for the purpose of selectively energizing a second buffer unit 44. The connections 51, 53 and 54 respectively join the selector line 46 with leads 17, 19, and 20 of input circuits 13, 14 and 15. The connections 55, 56 and 57 join the selector line 47 with the output leads 17, 18 and 21 respectively of input circuits 13, 14 and 15. The selector line 48 is joined by connections 58, 59 and 61 with the leads 16, 19 and 21 of input circuits 13, 14 and 15.

Selector lines 46, 47 and 48 are energized to deliver an input signal to buffer unit 44 when concurrently linked to three energized output leads of said circuits 13, 14, and 15. However, it is noted that each of the selector lines 46, 47 and 48 is so conditioned only when two of the three input circuits 13, 14 and 15 are concurrently excited over the respective input terminals 10, 11 and 12. For example, if input circuits 13 and 14 are energized, excitation is respectively switched to the normally non-excited output leads 17 and 19, while the normally excited lead 20 of circuit 15 remains excited. This results in the conditioning of selector line 46 which excites buffer unit 44 delivering an output signal to output terminal 71. In a similar manner, if input circuits 13 and 15 are energized the selector line 47 now energizes buffer 44 to deliver an output signal to the terminal 71. Finally, the excitation of circuits 14 and 15 results in the excitation of buffer unit 44 via the selector line 48.

Thus, the three selector lines 46, 47 and 48 effect the delivery of an output signal upon the second output terminal 71 when any two of the three input circuits 13, 14 and 15 are concurrently energized.

Another selector line 64, which concurrently delivers input signals to both buffer units 30 and 44 when all three input circuits 13, 14 and 15 are concurrently energized, is linked to the output leads 17, 19 and 21 respectively of circuits 13, 14 and 15 by means of connections 65, 67 and 69. Thus, when the input circuits 13, 14 and 15 are concurrently energized, excitation is switched to their respective output leads 17, 19 and 21, conditioning the selector line 64 for delivery of input signals to buffer units 30 and 44 resulting in a concurrent delivery of output signals over the terminals 70 and 71.

The second output terminal 71 may further be returned to one of the input circuits via the delay network 72 which has its output connected to signal terminal 12 associated with the input circuit 15. The delay network 72 is useful when separate signal trains are to be delivered over two of the input terminals for example 10 and 11 at a predetermined repetition rate, and signals delivered to the second ouput 71 are to be carried over to a following period for delivery to a third input circuit 15. This arrangement is of great utility in connection with the elecronic computer art. For example, it will be shown that if signal trains are delivered to terminals 10 and 11, which are characterized by the absence or presence of signals in given pulse positions so as to represent binary numbers, in which case the absence of a signal may designate a zero, while the presence may represent a one, the output signals of the first output terminal 70 will be a train of signals characterized by the absence or presence of signals in given positions representing in binary form the addition of the binary numbers represented by the input signals.

It is noted that this apparatus is not specifically limited to this manner of employment but may be used to deliver static output signals, or may be employed with three input signals, to give but a few examples.

Figure 2:
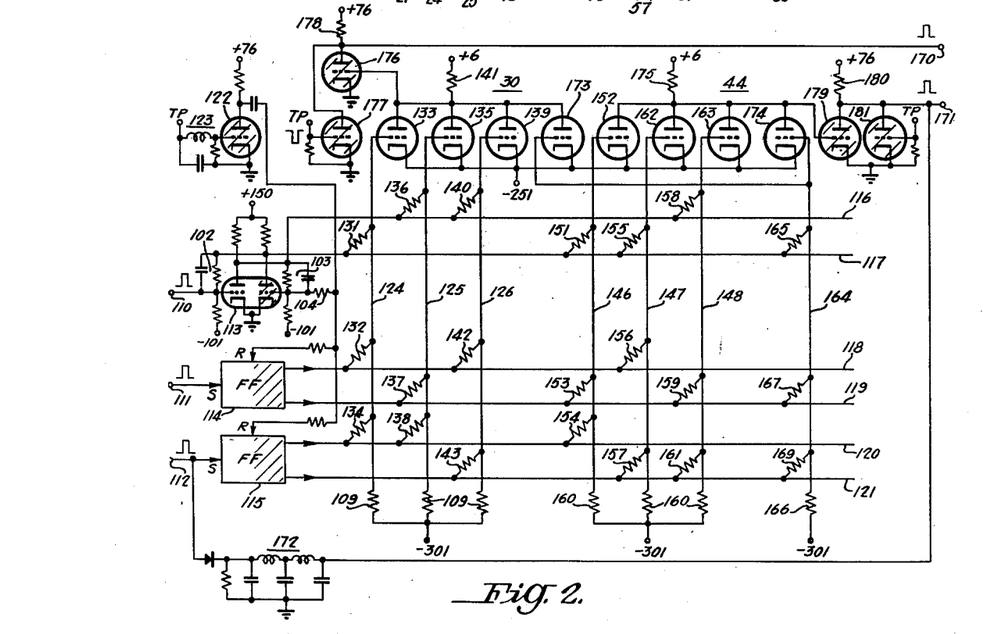
Figure 2 illustrates schematically a signal responsive network conforming to the block diagram shown in Figure 1.

Refer now to Figure 2 which illustrates schematically a signal responsive network conforming to the block diagram of Figure 1. Signal input terminals 110, 111 and 112 may receive positive-going signal trains having a predetermined repetition rate and bearing significance by the presence or absence of siganls in given signal positions. The signal input terminal 110 is connected to the control electrode of a two-section flip-flop valve 113 in an input circuit. This control electrode is in the normally nonconducting section of the flip-flop valve 113 and is biased by return through the usual grid resistor to a negative bus 101. The cathodes of both sections of flip-flop valve 113 are returned to ground potential while their respective anodes are returned to a positive bus 150 through individual load resistors. The control electrode of the normally nonconduucting section of valve 113 is cross-coupled by a parallel resistor and capacitor network 102 to the anode of the second section of this valve which is normally conducting. Likewise, the control electrode of the normally conducting section of valve 113 is cross-coupled by a parallel resistor and capacitor network 103 to the anode of the normally nonconducting section, and biased by return through the usual grid resistor to the negative bus 101.

The flip-flop valve 113 has the anode of its normally nonconductive section connected to the output lead 116 while the anode of the normally conducting section is connected to the output lead 117.

Thus, normally the output lead 116 connected to the anode of the normally nonconducting section of valve 113 is maintained at a potential relatively higher than that of the output lead 117 connected to the anode of the normally conducting section. This is due to the small voltage drop in the resistor associated with the normally nonconducting section of valve 113, while a greater voltage drop is incurred through the load resistor associated with the normally conducting section of this valve.

When a positive-going signal is delivered over the input terminal 110 to the control electrode of the normally nonconducting section of valve 113 this section becomes conductive and renders the normally conductive section of this valve nonconducting. Cut-off of the normally conductive section of valve 113 is achieved by the delivery of a lowered voltage to the control electrode of that section from the anode of the normally nonconductive section which is now conductive.

The transfer of conduction from the normally conducting section of valve 113 to the normally nonconducting section of this valve also results in reversing the potentials on the output leads 116 and 117, causing lead 116 to assume the relatively lower potential while lead 117 assumes the higher potential. This state is maintained until the flip-flop valve 113 is reset to its original normal condition.

A reset valve 122 which is normally conducting has its control electrode linked to a timing pulse source of signals. This source delivers signals at a predetermined repetition rate through a delay network 123 which comprises a series inductor and a shut input capacitor. The control electrode of reset valve 122 is also returned to ground potential through an ordinary grid resistor and its anode is joined to a positive bus 76 through a usual anode resistor.

When a negative signal is delivered from the timing pulse terminal to the control electrode of valve 122 this valve is cut off to develop a positive-going signal upon its anode. This positive signal is transmitted through a coupling capacitor in series with an isolating resistor to the control electrode of the normally conducting section of the flip-flop valve 113 assuring that the flip-flop valve 113 is reset with its normally conducting side conductive and its normally non-conducting side cut off. The parallel resistor capacitor cross-coupling from the anode of the normally conducting section of valve 113 to the control electrode of the normally nonconducting section of this valve assures the transfer of conduction from the normally nonconducting section of valve 113 to the normally conductive section of valve 113 when flip-flop valve 113 is reset.

It is obvious that with the resetting of the flip-flop valve 113 the relative potentials upon the output leads 116 and 117 are returned to their original states with the voltage upon the lead 116 normally greater than that upon lead 117.

The flip-flop circuit 114 shown in block form may be identical to that illustrated in connection with flip-flop valve 113, receiving positive-going signals over the terminal 111 and normally maintaining its output lead 118 at a potential greater than that of its output lead 119. When flip-flop 114 is energized by positive-going signal over terminal 111 the relative potentials on output leads at 118 and 119 are reversed so that output lead 119 is at a greater potential than output lead 118. This state is maintained until the flip-flop 114 is reset to its original condition by the receipt of a positive-going signal from the reset valve 122 through the coupling capacitor and an insolating resistor.

The flip-flop circuit 115 may also be identical with that schematically illustrated and associated with valve 113, receiving positive-going signals over an input terminal 112 and normally maintaining its output lead 120 at a potential greater than that of its output lead 121. When flip-flop 115 is energized with a positive-going signal over its input terminal 112, the relative potentials on its output leads 120 and 121 are reversed and maintained in this state until flip-flop 115 is reset by a signal derived from the reset valve 122 through the coupling capacitor and an isolating resistor.

The selector lines 124, 125, and 126 which are associated with the output leads of the flip-flop circuits 113, 114 and 115 are biased by having one end returned through respective resistors 109 to a negative potential bus 301. The other ends of lines 124, 125 and 126 are directly connected to the control electrodes of respective buffer valves 133, 135 and 139. The buffer valves 133, 135, and 139 are parallel connected having their cathodes returned to negative bus 251 and their anodes joined to positive bus 6 through a common anode resistor 141. The buffer valves 133, 135 and 139 are normally nonconducting.

The selector line 124 is connected with the output lead 117 of flip-flop circuit 113 through a coupling resistor 131. Selector line 124 is also respectively connected by means of coupling resistors 132, and 134 with the output leads 118 and 120 of flip-flop circuits 114 and 115. The order of magnitude of resistance of the coupling resistors such as 131 may be approximately ten times the resistance of its associated selector line bias resistor such as at 109.

The selector line 125 is respectively connected by coupling resistors 136, 137 and 138 with output leads 116, 119 and 120. The selector line 126 is connected by means of coupling resistors 140, 142 and 143 with respective output leads 116, 118 and 121.

The condition required to render conductive a buffing valve 133, 135, 139, associated with a selector line 124, 125, 126 is that the selector line be returned by its three coupling resistors to output leads of the circuit 113, 114, 115 each of which is at its most positive voltage excursion level. It is obvious that when each of the flip-flop circuits 113, 114, 115 are in their normal states the selector lines 124, 125, and 126 are each coupled by a respective resistor 131, 137, 143 to an output lead maintained at its lower voltage excursion level. This prevents the conduction of any one of the buffer valves 133, 135 and 139.

However, when any one of the inut flip-flop circuits 113, 114, and 115 is set up by a positive-going signal over its respective input terminal 110, 111 and 112, a respective one of the selector lines 124, 125, and 126 will have its potential level sufficiently raised to permit conduction of its associated buffing valve. Conduction of any one of the buffing valves 133, 135, 139 results in the development of a negative-going signal upon their anodes.

It is further noted that if two flip-flop circuits are set up concurrently, none of the selector lines 124, 125, 126 is conditioned to deliver a sufficiently positive signal to its associated buffing valve to render it conductive.

Another set of selector lines 146, 147, and 148 associated with the output leads of the circuits 113, 114, and 115 are each biased by having one end respectively returned through resistors 160 to the negative potential bus 301. The other ends of the selector lines 146, 147, and 148 are respectively joined to the control electrodes of buffing valves 152, 162, and 163. The buffing valves 152, 162 and 163 are connected in parallel, having their cathodes directly joined to negative bus 251 and their anodes returned to positive bus 6 through a common anode resistor 175. The buffing valves 152, 162 and 163 are normally nonconducting.

Coupling resistors 151, 153, and 154 individually link the selector line 146 with respective output leads 117, 119, and 120 of circuits 113, 114 and 115. The coupling resistors 155, 156 and 157 respectively join the selector line 147 to the output leads 117, 119, and 121 of said input circuits. The coupling resistors 158, 159 and 161 similarly join the selector line 148 with the combination of output leads 116, 119, and 121 respectively of said flip-flop circuits.

The order of magnitude of resistance of the coupling resistors such as 151 may be approximately ten times the resistance of its associated selector line bias resistors such as at 160.

The condition required for a selector line 146, 147 and 148 to deliver a sufficiently positive input signal to the control electrode of an associated buffing valve 152, 162 and 163 to render it conductive is the same as for selector lines 124, 125 and 126. Thus, with none of the input flip-flop circuits 113, 114, and 115 set up by a positive-going signal receive over its respective input terminals 110, 111 and 112 none of the buffing valves 152, 162 and 163 will be conductive. However, if any two of the said flip-flop circuits are concurrently set up a respective one of said buffing valves 152, 162 and 163 will be rendered conducting. For example, if flip-flop circuits 113 and 114 are concurrently set up by receiving positive-going signals, output leads 117, 119 and 120 respectively coupled through resistors 151, 153, and 154 to the selector line 146 are all at their positive voltage excursion level, causing conduction of buffing valve 152. If input flip-flop 113 and 115 are concurrently set up the selector line 147 delivers a sufficiently positive signal to render its associated buffing valve 162 conductive. Likewise, if flip-flop circuits 114 and 115 are concurrently set up, the selector line 148 is so energized that its associated buffing valve 163 is made conductive.

When any one of the buffing valves 152, 162 and 163 is made conductive, a negative-going voltage is developed upon their anodes.

A further selecting line 164 is also connected with the output leads 117, 119, and 121 of flip-flop circuits 113, 114 and 115 by means of respective coupling resistors 165, 167 and 169. One end of the selector line 164 is biased by connecting through a resistor 166 to the negative potential bus 301. The other end of the selector line 164 is directly connected to the control electrodes respectively of buffing valves 173 and 174.

The order of magnitude of resistance of each coupling resistor 165, 167, 169 may be approximately ten times the resistance of its associated selector line bias resistor 166.

The cathodes of both valves 173 and 174 are returned to negative potential bus 251 while the anode of valve 173 is returned to positive bus 6 through the common anode resistor 141, and the anode of valve 174 is returned through the common anode resistor 175 to positive potential bus 6.

The selector line 164 delivers a sufficiently positive voltage to the control electrodes of valves 173 and 174 to render them conducting only when all three of the input flip-flop circuits 113, 114 and 115 are concurrently set up by the receipt of positive signals over their respective input terminals 110, 111 and 112. Under such circumstances, the coupling resistors 165, 167 and 169 return the selector line 164 to output leads each of which is maintained at its upper potential excursion level.

Thus, the conduction of buffing valve 173 develops a negative-going signal upon the anodes of the group of associated buffing valves 113, 135, 139 and 173, and the conduction of the buffing valve 174 develops a negative-going signal upon the anodes of the associated buffing valves 152, 162, 163, and 174. These signals are developed concurrently.

The associated group of buffing valves 133, 135, 139 and 173 have their anodes linked to the control electrode of a normally conducting signal output valve 176.

The signal output valve 176 and an associated timing valve 177 are connected in parallel by both having their cathodes returned to ground potential and their anodes returned to positive bus 76 through a common anode resistor 178. The anodes of valves 176 and 177 are also linked to a first output terminal 170. The control electrode of the normally conducting signal timing valve 177 is returned to ground potential through the ordinary grid resistor and directly linked to the timing pulse terminal receiving negative-going signals at the predetermined repetition rate.

Signal output valve 176 is rendered nonconductive by the development of negative-going signal in the anode circuits of the buffing valves 133, 135, 139 and 173. The cutoff of the signal output valve 176 however, does not deliver a positive-going signal to the output terminal 170 until the associated timing valve 177 is also rendered nonconductive by the receipt of a negative-going timing pulse upon its control electrode. Thus, the timing pulse signals delivered to the valve 177 act to time output signals over the output terminal 170 after the signal output valve 176 has been rendered nonconductive.

A signal output valve 179 which is normally conducting has its control electrode connected to the anodes of the associated buffing valves 152, 162, 163 and 174. Valve 179 is also associated with a parallel connected timing valve 181.

The valves 179 and 181 both have their cathodes returned to ground potentials and their anodes joined to positive bus 76 through a common anode resistor 180. The anodes of valves 179 and 181 are also linked to a second signal output terminal 171. The control electrode of timing valve 181 is returned to ground potential through the usual grid resistor and directly linked to the timing pulse terminal receiving negative-going signals of the predetermined repetition rate.

The development of a negative-going signal in the anode circuit of valves 152, 162, 163, and 174 renders the signal output valve 179 nonconductive. However, a positive-going signal is not developed in its anode circuit until the signal timing valve 181 is rendered nonconducting by receipt of a negative-going timing signal. In this manner, the development of a positive-going signal in the anode circuit of valves 179 and 181 upon the cutoff of valve 181 after valve 179 has been rendered nonconducting results in the delivery of a positive-going timed signal to the second output terminal 171.

The second output terminal 171 is also connected to the input lead of a delay network 172 comprising series inductors and shunt capacitors joining the ends of said inductors to ground potential. The output end of the delay network 172 is shunted by a terminating resistor and connected to the anode of a crystal diode which has its cathode joined to the signal input terminal 112 associated with input flip-flop circuit 115.

Positive-going signals are thus delivered by means of the delay network 172 from signal output terminal 171 to the signal input terminal 112. The poling of the crystal diode prevents the transmission of negative-going signals. The delay imposed by the delay network 172 may be equivalent to the period of signal trains delivered to the input terminal 110, 111.

Considering the overall operation of the apparatus shown in Figure 1, if any one of the flip-flop circuits is set up by receiving a positive-going signal over its associated input terminal, one of the buffing valves 133, 135, and 139 will be rendered conducting. This will cause the cutoff of signal output valve 176 which will deliver a positive-going signal to the output terminal 170 upon the occurrence of a timing signal delivered to valve 177.

The flip-flop circuits set up are reset by the receipt of a positive-going signal from the reset valve 122 when energized by a negative-going signal from the timing pulse terminal. It is noted that the delay network 123 may be used to delay delivery of the timing signal to the reset valve 122 so that the flip-flop circuits 113, 114 and 115 are reset after the timing pulse signal delivered to the valve 177 and 181 has cut off these valves for delivering output signals respectively to the terminals 170, 171. The delay line network 123, however, may not be necessary in the case when the resetting action of the input circuits 113, 114 and 115 is not so rapid as to affect output signals delivered to the valves 176 and 179.

When positive signals are concurrently delivered over any two of the three input terminals 110, 111, 112, a respective one of the selector lines 146, 147 and 148 renders conductive one of its associated buffing valves 152, 162, and 163 to cut off the signal output valve 179. With the arrival of the next negative timing pulse at the timing valve 181, a positive-going signal is delivered to the second output terminal 171. With the use of the delay network 172, this positive signal is delivered to the input terminal 112 associated with flip-flop 115 after a delay of approximately one pulse period.

When three positive-going signals are concurrently delivered to the input terminals 110, 111 and 112, the selector line 164 renders conductive its associated buffing valves 173 and 174. This results in the cutoff of both output valves 176 and 179. With the next arriving timing pulse, positive-going output signals are delivered over both the first and second output terminals 170 and 171. With the use of the delay network 172, the positive signal on the second output terminal 171 is delivered during the next pulse period to the input of flip-flop 115.

An exposition applicable to this circuit illustrating its particular operation and application will be rendered in connection with Figure 4 which is discussed later.

Figure 3:
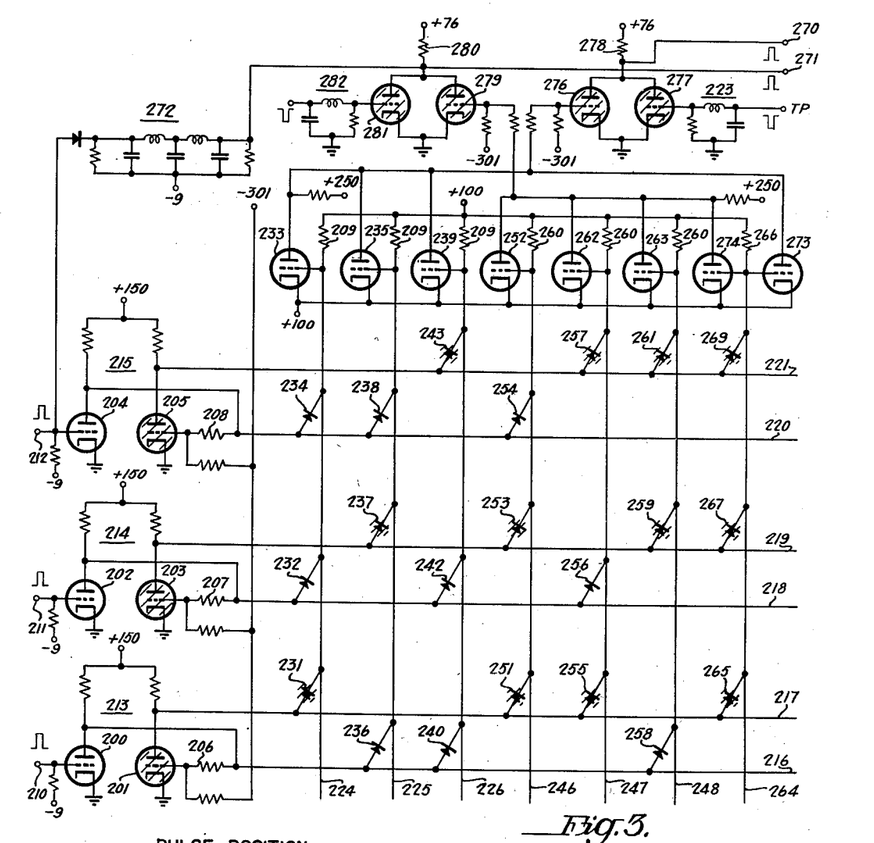
Figure 3 illustrates schematically another signal responsive network conforming to the block diagram shown in Figure 1.

Refer now to Figure 3 which illustrates schematically another signal responsive network conforming to the block diagram shown in Figure 1. Signal input terminals 210, 211 and 212 are adapted to received positive-going signal trains having a predetermined repetition rate and bearing significance by the presence or absence of signals in given signal positions. The signal input terminal 210 is connected to the control electrode of a normally nonconducting valve 200 in an input circuit 213. The control electrode of valve 200 is negatively biased by return through the usual grid resistor to negative bus 9, the cathode is returned to ground potential, while the anode is returned to positive bus 150 through an anode resistor. A companion valve 201 in the input circuit 213 is normally conducting and has its control electrode linked to the anode of valve 200 through a coupling resistor 206 and biased by connecting to negative bus 301 through the usual grid resistor, its cathode returned to ground potential and its anode joined to positive bus 150 through the usual anode load resistor. An output lead 216 is connected to the anode of valve 200, while a second output lead 217 is connected to the anode of valve 201. Under normal conditions with the valve 200 nonconducting and valve 201 conducting, the output lead 216 is maintained at a more positive potential than output lead 217.

When a positive signal is received over input terminal 210, the negative bias imposed upon the control electrode of valve 200 is overcome making this valve conductive. The negative-going voltage developed in the anode circuit of valve 200 is delivered to the control electrode of valve 201 rendering it nonconductive. This results in reversing the potentials upon the output leads 216 and 217, so that the voltage upon the output lead 217 is now greater than that upon the lead 216.

The input circuit 214 is similar to that of 213, having a normally nonconducting valve 202 and a normally conducting valve 203. The control electrode of valve 202 receives positive-going signals over the input terminal 211 and the anode of valve 201 is similarly cross-connected to the control electrode of valve 203 by means of a coupling resistor 207. Thus, a signal output lead 218 which is connected to the anode of valve 202 is normally maintained at a higher potential than an associated output lead 219 connected to the anode of normally conducting valve 203.

Upon receipt of a positive-going signal on the input terminal 211, the valve 203 transfers conduction to valve 202, resulting in reversing the potentials upon the signal output leads 218 and 219, so that output lead 219 is now at a potential higher than that on 218. With the removal of the positive-going signal from the input terminal 211, the valves 202 and 203 reassume their normal conditions resulting in the re-establishment of the normal potentials upon the output leads 218 and 219.

A signal input circuit 215 is also comprised of a normally nonconducting valve 204 and normally conducting valve 205. The control electrode of valve 204 is joined to the signal input terminal 212 while its anode is cross-coupled to the control electrode of valve 205 by means of a coupling resistor 208. A signal output lead 220 is connected to the anode of the normally nonconducting valve 204, while a signal output lead 221 joins the anode of the normally conducting valve 205. The nonconductive state of valve 204 maintains signal output lead 220 at a potential relatively higher than the potential normally impressed on the signal output line 221.

With the receipt of a positive-going signal upon input terminal 212 conduction is transferred from valve 205 to valve 204 resulting in the reversal of potentials upon the signal output leads 220 and 221. With the removal of a positive-going signal from the control electrode of valve 204 the normal conditions are reassumed by valves 204 and 205 re-establishing the normal potentials upon the output leads 220 and 221.

Three selector lines 224, 225 and 226 are associated with the output leads 216, 217, 218, 219, 220 and 221 respectively of input circuits 213, 214, and 215. The selector lines 224, 225 and 226 are positively biased by returning through individual load resistors 209 to a positive bus 100, and are directly connected to the control electrodes of respective buffing valves 233, 235 and 239, which are normally nonconducting.

The buffing valves 233, 235 and 239 are parallel connected each having its cathode returned to positive bus 100, and their anodes are returned by a common anode resistor to positive bus 250.

The selector line 224 connects to the anodes of three crystal diodes 231, 232 and 234 which have their cathodes respectively connected to output leads 217, 218 and 220. The selector line 225 is similarly connected to the anodes of three crystal diodes 236, 239 and 238, which have their anodes respectively connected to output leads 216, 219 and 220. The selector line 226 also is connected to the anodes of three crystal diodes 240, 242, and 243, their cathodes being respectively connected to signal output lines 216, 218 and 221.

When the signal input circuits 213, 214 and 215 are in their normal states, one of the crystal diodes associated with each of the selector lines 224, 225 and 226 is conducting, drawing current through their associated load resistors 209 to maintain their associated buffing valve 233, 235, and 239 cut off. For example, with the circuits 213, 214 and 215 in their normal states, the crystal diode 231 having its anode connected to the selector line 224 has its cathode connected to the output lead 217 maintained at a lowered potential level. This allows current flow therethrough developing a voltage drop across the load resistor 209 and delivering a sufficiently negative potential to the control electrode of buffing valve 233 to maintain it nonconducting. Likewise, the crystal diodes 237 and 243 associated with selector lines 225 and 226 are also conducting to maintain the respective buffing valves 235 and 239 nonconducting. If any one of the input circuits 213, 214 and 215, but only one, receives a positive signal over its associated input terminal 210, 211 and 212, reversing the potential upon its output leads a respective one of the signal selector lines 224, 225 and 226, will have all of its associated crystal diodes nonconducting. This will so reduce the current flow through its load resistor 209 that a sufficiently positive signal will be delivered to its associated buffing valve resulting in its conduction. Conduction of any one of the parallel connected buffing valves 233, 235 and 239 results in the development of a positive-going signal upon their anodes.

For example, if a positive-going signal is received by the input circuit 213 over its input terminal 210, the voltage excursion of the output lead 217 to its upper limit will impress a potential upon the cathode of crystal diode 213 higher than the voltage upon its anode preventing its conduction. The crystal diodes 232 and 234 will remain nonconducting. This results in a decreased voltage drop across the load resistor 209, impressing a sufficiently positive signal upon the control electrode of buffing valve 233 to allow its conduction.

In a similar manner, the crystal diodes 237 and 243 respectively associated with selector lines 225 and 226 become nonconducting with the noncurrent receipt of positive-going signals over a respective one of the input terminals 211 and 212. This results in the conduction of the respective one of the associated buffing valves 235 and 239.

If more than one signal is concurrently received over the input terminals 210, 211 and 212, at least one of the diodes associated with each of the selector lines 224, 225 and 226 will be conductive to prevent the excitation of the associated buffing valves 233, 235 and 239 and the development of a negative-going output signal in their anode circuit.

Three selector lines 246, 247 and 248 also associated with the output leads 216, 217 and 218, 219 and 220 and 221 are positively biased by return through individual load resistors 260 to positive bus 100. Each selector line 246, 247 and 248 is respectively connected to the control electrode of an associated buffing valve 252, 262 and 263 which valves are normally nonconducting.

The buffing valves 252, 262 and 263 are connected in parallel having their cathodes directly returned to positive bus 100 and their anodes joined through a common anode resistor to positive bus 250.

The selector line 246 is connected to the anodes of three crystal diodes 251, 253, and 254 which have their cathodes respectively connected to output leads 217, 219 and 220. The selector line 247 is connected in a similar manner to the anodes of three crystal diodes 255, 256 and 257 which have their cathodes respectively connected to output lines 217, 218 and 221. The selector line 248 is also connected to the anodes of three crystal diodes 258, 259 and 261 which have their cathodes respectively connected to the signal output leads 216, 219 and 221.

With the input circuits 213, 214 and 215 in their normal states, two crystal diodes associated with each of the selector lines 246, 247 and 248 are conducting, resulting in a voltage drop across their respective load resistors 260 which impresses sufficiently negative potential upon the control electrodes of the associated buffing valves 252, 262 and 263 to maintain them nonconducting.

For example, with the input circuit 213, 214, 215 in their normal states, the crystal diodes 251, 253 associated with selector line 246, diodes 255, 257, associated with selector line 247 and diodes 259, 261 associated with selector line 248 all have their cathodes returned to an output lead which is at its lower potential excursion level. This results in the conduction of said diodes and the accompanying voltage drop through their associated load resistors 260 impressing a negative cutoff voltage on their respective buffing valves 252, 262 and 263. However, with receipt of two concurrent positive signals by two of the input circuits 213, 214 and 215, the two normally conducting diodes of a respective selector line 246, 247 and 248 will be rendered nonconducting reducing the current flow through its associated load resistor 260 to the extent that a sufficiently positive signal is delivered to its associated buffing valve making it conductive. With the conduction of any one of the parallel connected buffing valves 252, 262 and 263 a negative signal is developed upon their anodes.

For example, if concurrent positive-going signals are delivered to the input circuits 213 and 214, resulting in the positive excursion of their respective output leads 217 and 219 the voltage on the cathodes of the respective crystal diodes 251 and 253 associated therewith is raised sufficiently to render them nonconducting. The crystal diode 254 associated with selector line 246 also remains nonconducting reducing sufficiently the voltage drop across the load resistor 260 to render the buffing valve 252 conducting. It is noted here that the conduction of any one of the crystal diodes associated with the selector line is sufficient to prevent the delivery of a sufficiently positive signal to an associated buffing valve for allowing it to assume conductivity.

In a respective manner the delivery of concurrent signals to input circuits 213 and 215 render conductive the buffing valve 262 associated with selector line 245, while the delivery of concurrent positive-going signals to the buffing circuits 214 and 215 causes buffing valve 263 associated with selector line 248 to conduct.

It is obvious that the concurrent delivery of positive going signals to all three input circuits 213, 214 and 215 does not render conductive any of the buffing valves 252, 262 and 263 respectively associated with selector lines 246, 247 and 248.

The selector line 264 is positively biased by its return through a load resistor 266 to positive bus 100 and is directly connected to the control electrodes of normally nonconducting buffing valves 273 and 274. The buffing valves 273 and 274 have their cathodes returned to positive bus 100 while the anode of valve 273 is connected to the anodes of valves 233, 235 and 239 associated with the first described set of selector lines 224 and 225 and 226, and the anode of valve 274 is connected to the anodes of valves 252, 262 and 263 associated with the second described set of selector lines 246, 247 and 248. The conduction of buffing valves 273 results in the development of a negative-going signal upon the anodes of valves 233, 235, 239 and 273 while the conduction of valve 274 results in a negative-going signal upon the anodes of associated valves 252, 262, 263 and 274.

The selector line 264 is connected to the anodes of three crystal diodes 265, 267 and 269 which have their cathodes respectively connected with the output leads 217, 219 and 221.

When the input circuits 213, 214 and 215 are in their normal states, each of the diodes 265, 267 and 269 is conducting drawing its current through the load resistor 266 resulting in a sufficiently negative voltage being delivered to the control electrodes of associated buffing valves 273 and 274 to render them nonconducting. Only when concurrent positive-going signals are delivered to all three of the signal input circuits 213, 214, and 215 are the three crystal diodes 265, 267 and 269 each cutoff. Only with the simultaneous nonconduction of said diodes is the voltage drop sufficiently reduced across the load resistor 266 to render the buffing valves 273 and 274 conductive.

The anodes of the buffing valves 233, 235, 239 and 273 are resistor coupled to the control electrode of a normally conducting signal output valve 276. The cathodes of the signal output valve 276 and an associated normally conducting timing valve 277 are both returned to ground potential while their anodes are joined to a positive bus 76 through a common anode resistor 278 and connected to a first signal output terminal 270. The usual grid resistor returns the control electrode of signal output valve 276 to negative bus 301, while the control electrode of signal timing valve 277 is returned by a grid resistor to ground potential and linked to a timing pulse terminal through a delay network 223 comprising a series inductor and a shunt input capacitor.

The signal output valve 276 is cut off when a negative-going signal is developed in the anode circuit of the valves 233, 235, 239 and 273. A positive-going signal is not delivered to the signal output terminal 270 until the signal timing valve 277 is thereafter rendered nonconductive by the receipt of a negative-going timing pulse from the timing pulse terminal. The negative signals received from the timing pulse terminal occur at a reptition rate equal to the repetition rate of input signals delivered to the input terminals 210 and 211. The delay imposed by network 223 causes the cutoff of timing valve 277 after the cutoff of signal output valve 276 allowing the effective timing of output signals to terminal 270.

A similar circuit comprising a signal output valve 279 and parallel connected signal timing valve 281 are both normally conducting. The signal output valve 279 has its control electrode resistance coupled to the anodes of associated buffing valves 252, 262, 263 and 274. The control electrode of valve 279 is also biased by return through an ordinary grid resistor to a negative bus 301. The cathodes of both valves 279 and 281 are directly returned to ground potential while their anodes are joined through a common load resistor 280 to positive bus 76. The control electrode of valve 281 is also returned to ground potential through the usual grid resistor and linked to the timing pulse terminal through a similar delay network 282.

A signal output valve 279 is cut off when a negative-going signal is developed in the anode circuit of valves 252, 262, 263, and 274. However, a positive-going signal is not delivered to the signal output terminal 271 until the signal timing valve 281 is cut off shortly thereafter by the arrival of a negative-going timing pulse signal.

The signal output terminal 271 is also connected through a delay network 272 and a series connected crystal diode to the input terminal 212 associated with the input circuit 215. The delay network 272 is comprised of series inductors having their ends bridged to ground potential by shunt capacitors. The input and output ends of the delay network 272 are shunted by terminating resistors. The characteristic delay imposed by the network 272 upon signals passing therethrough is approximately equal to the period of one pulse time at the pre-determined rate of delivery of input signals to the terminals 210 and 211. The crystal diode connected between the output of the network 272 and the input terminal 212 is poled so that only positive-going signals are transferred by it.

Summarizing the operation of the circuit shown in Figure 3, with the receipt of only one positive-going signal over one of the input terminals 210, 211 and 212, a respective one of the signal buffing valves 233, 235 and 239 is made conducting, to develop a negative-going signal in its anode circuit which is delivered to the signal output valve 276, cutting it off. With the arrival of a timing pulse to signal timing valve 277, a positive-going signal is delivered to the first output terminal 270.

If concurrent signals are delivered to any two of the input terminals 210, 211 and 212, a respective one of the buffing valves 252, 262 and 263 is cut off developing a negative-going signal which is delivered to the signal output valve 279, rendering it nonconductive. With the cutoff of the signal timing valve 281 shortly thereafter, by the arrival of a negative-going timing pulse, a positive signal is delivered over the second output terminal 271. This positive signal is also transmitted through the delay network 272 and the series crystal diode to the input terminal 212 after a delay of approximately one signal period.

When three concurrent positive-going signals are delivered over the input terminals 210, 211 and 212, buffing valves 273 and 274 are concurrently cut off respectively delivering negative-going cutoff signals to the signal output valves 276 and 279. With the cutoff of their associated signal timing valves 277 and 281, positive-going signals are concurrently delivered to first and second output terminals 270 and 271. The output signal delivered to terminal 271 is also passed to the input terminal 212 after a delay of approximately one signal period.

Figure 4:
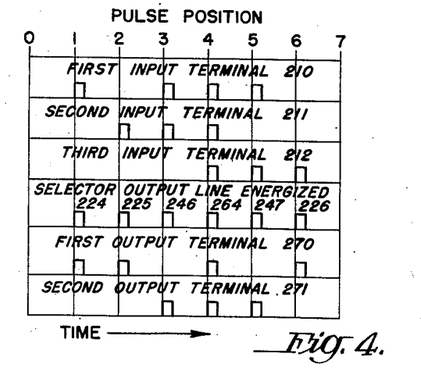
Figure 4 illustrates in graphic form the signal response to input signals of the network shown in Figure 3.

Figure 4 aids in better understanding the operation of the previously described circuits. Although this graphic illustration is applicable to Figures 1, 2, and 3, it is particularly applied to the apparatus shown in Figure 3 for purposes of greater clarity. The graph divides time into equal intervals designated by pulse positions, pulse position increasing with time. Trains of signals are respectively delivered to the input of terminals 210 and 211 at the predetermined rate. The signal train delivered to input terminal 210 is characterized by signals in the first, third, fourth and fifth pulse positions, while the train of signals delivered to the second input terminal 211 is characterized by the presence of signals in the second, third and fourth pulse positions.

In the zero pulse position, it is evident that signals are not received on either the first, second or third input terminals 210, 211, 212. Therefore, none of the selector lines is energized nor is an output signal delivered over the output terminals 270, 271. A positive-going signal is received over terminal 210 in pulse position 1. This results in the energizing of selector line 224, to deliver a positive-going signal over the first output terminal 270.

In pulse position 2, the second input terminal 211 is singly energized resulting in the excitation of selector line 225 and the delivery of signal over output terminal 270. In pulse position 3, input terminals 210 and 211 are concurrently stimulated to excite selector line 246. An output signal is delivered over the second output terminal 271 in this pulse position. This signal is also transmitted via the delay network 272 to the third input terminal 212 arriving in pulse position 4. Concurrent signals are also received by terminals 210 and 211 in pulse position 4 resulting in the excitation of selector line 264, effecting the delivery of signals to both output terminals 270 and 271. The delivery of the output signal to terminal 271 results in the impression of a positive signal on the third input terminal 212 in pulse position 5. A signal is also delivered to the first input terminal 210 at this time, causing the excitation of selector line 247 and delivery of a signal to the second output terminal 271. This results in the delivery of a signal to the third input terminal 212, which appears in the sixth pulse position after delay of one pulse position. The absence of signals upon the input terminals 210 and 211 in pulse position 6 while this signal is impressed upon the terminal 212 causes excitation of signal line 226. A positive signal is delivered over the first output terminal 270 in pulse position 6.

The importance of this invention in connection with electronic numerical computation is evident if the signal input trains are considered to represent binary numbers. In this case, the presence of a signal may be used to represent the binary number "1," while the absence of a signal may represent a binary number "0." Thus, the signal train delivered to the terminal 210 may represent the binary number 11101, if pulse position 1 is considered the least significant position, and the significance of binary numbers increases with the pulse position. The signal train delivered to the second input terminal 211 similarly represents the binary number 1110. It is noted that the apparatus is designed to receive the least significant signals in the signal train earliest in time.

Particular attention is now given to a signal train delivered over the first output terminal 270 which in binary form represents 101011. It is evident that this represents the binary sum of the binary numbers represented by the signals delivered over the first and second input terminals 210 and 211.

It is evident that the apparatus disclosed herein may be utilized as statically responsive devices, in which case signal timing valves such as 171, 181 of Figure 2, and 277, 281 of Figure 3 may be eliminated. These circuits may also be used with three external signal input sources in which case the delay elements 72, 172 and 272 may be discarded.

While only a few representative embodiments of apparatus for practising the invention disclosed herein have been outlined in detail, there will be obvious to those skilled in the art, many modifications and variations accomplishing the foregoing objects and realizing many or all of the advantages, but which yet do not depart essentially from the spirit of the invention.

What is claimed is:

1. In combination; three input devices, each comprising a pair of output leads which have differing electrical states, and an input lead adapted to receive stimuli for reversing the electrical states of said pair of output leads; first and second output units delivering an output signal upon excitation; and a selecting network comprising three pairs of input conductors respectively connecting with the pairs of output leads of said input devices; said selecting network exciting said first output unit upon stimulation of only one of said input devices, exciting said second output unit upon joint stimulation of only two of said input devices, and exciting said first and second output units upon concurrent stimulation of said three input devices.

2. In combination; three input devices, each comprising a pair of output leads which have differing electrical states, and an input lead adapted to receive stimuli for reversing the electrical state of said pair of output leads; first and second output units delivering an output signal upon excitation; a selecting network comprising three pairs of input conductors respectively connecting with the pairs of output leads of said input devices; said selecting network exciting said first output unit upon stimulation of only one of said input devices, exciting said second output unit upon joint stimulation of only two of said input devices, and exciting said first and second output units upon concurrent stimulation of said three input devices; and a delay network delivering stimuli to the input lead of one of said input devices from said second output unit.

3. In combination; three input devices, each comprising a pair of output leads which have differing electrical states, and an input lead adapted to receive stimuli for reversing the electrical states of said pair of output leads; first and second conditioned output units delivering an output signal upon excitation; a signal source conditioning said first and second output units; and a selecting network comprising three pairs of input conductors respectively connecting with the pairs of output leads of said input devices; said selecting network exciting said first output unit upon stimulation of only one of said input devices, exciting said second output unit upon joint stimulation of only two of said input devices, and exciting said first and second output units upon concurrent stimulation of said three input devices.

4. In combination; three input devices, each comprising a pair of output leads which have differing electrical states, and an input lead adapted to receive stimuli for reversing the electrical states of said pair of output leads; first and second conditioned output units delivering an output signal upon excitation; a signal source conditioning said first and second output units; a selecting network comprising three pairs of input conductors respectively connecting with the pairs of output leads of said input devices; said selecting network exciting said first output unit upon stimulation of only one of said input devices, exciting said second output unit upon joint stimulation of only two of said input devices, and exciting said first and second output units upon concurrent stimulation of said three input devices; and a delay network delivering stimuli to the input lead of one of said input devices from said second output unit.

5. In combination; three flip-flop devices, each comprising a pair of output leads which have differing electrical states, and an input lead adapted to receive stimuli for reversing the electrical states of said pair of output leads; first and second conditioned output units delivering an output signal upon excitation; a selecting network comprising three pairs of input conductors respectively connecting with the pairs of output leads of said input devices; said selecting network exciting said first output unit upon stimulation of only one of said input devices, exciting said second output unit upon joint stimulation of only two of said devices, and exciting said first and second output units upon concurrent stimulation of said three input devices; a delay network delivering stimuli to the input lead of one of said input devices from said second output unit; and a signal source characterized by a predetermined period conditioning said first and second output units and resetting said flip-flop devices.

6. In combination; three input devices, each comprising a pair of ouput leads one being normally energized and the other normally de-energized, and an input lead adapted to receive stimuli for reversing the electrical states of said pair of output leads; first and second output units delivering an output signal upon excitation; and a selecting network comprising first, second and third selector output lines for exciting said first output unit each individually connecting in differing combinations to the normally de-energized output lead of one of said input device and the normally energized output leads of the remaining two input devices, fourth, fifth and sixth selector output lines for exciting said second output unit each individually connecting in differing combinations to the normally energized output lead of one of said input device and to the normally de-energized output leads of the remaining two input devices, and a seventh selector output line for concurrently exciting said first and second output units individually connecting to the normally de-energized output leads of said three input devices.

7. In combination; three input devices, each comprising a pair of output leads one being normally energized and the other normally de-energized, and an input lead adapted to receive stimuli for reversing the electrical states of said pair of output leads; first and second output units delivering an output signal upon excitation; a delay network delivering stimuli to the input lead of one of said input devices from said second output unit; and a selecting network comprising first, second and third selector output lines for exciting said first output unit each individually connecting in differing combinations to the normally de-energized output lead of one of said input device and the normally energized output leads of the remaining two input devices, fourth, fifth and sixth selector output lines for exciting said second output unit each individually connecting in differing combinations to the normally energized output lead of one of said input device and to the normally de-energized output leads of the remaining two input devices, and a seventh selector output line for concurrently exciting said first and second output units individually connecting to the normally de-energized output leads of said three input devices.

8. In combination; three input devices, each comprising a pair of output leads one being normally energized and the other normally de-energized, and an input lead adapted to receive stimuli for reversing the electrical states of said pair of output leads; first and second output units delivering an output signal upon excitation; first, second and third selector output lines for exciting said first output unit; first, second and third sets of connections each set comprising three elements respectively connecting one of said first, second and third selector output lines in differing combinations to the normally de-energized output lead of one of said input devices and to the normally energized output leads of the remaining two input devices; fourth, fifth and sixth selector output lines for exciting said second output unit; fourth, fifth and sixth sets of connections each set comprising three elements respectively connecting one of said fourth, fifth and sixth selector output lines in differing combinations to the normally energized output lead of one of said input devices and to the normally de-energized output leads of the remaining two input devices; a seventh selector output line for concurrently exciting said first and second output units; and a seventh set of connections comprising three elements respectively connecting to the normally de-energized output leads of said three input devices.

9. In combination; three input devices, each comprising a pair of output leads one being normally energized and the other normally de-energized, and an input lead adapted to receive stimuli for reversing the electrical states of said pair of output leads; first and second output units delivering an output signal upon excitation; first second and third selector output lines for exciting said first output unit; first second and third sets of connections each set comprising three unilateral conducting elements respectively connecting one of said first second and third selector output lines in differing combinations to the normally de-energized output lead of one of said input devices and to the normally energized output leads of the remaining two input devices; fourth fifth and sixth selector output lines for exciting said second output unit; fourth fifth and sixth sets of connections each set comprising three unilateral conducting elements respectively connecting one of said fourth fifth and sixth selector output lines in differing combinations to the normally energized output lead of one of said input devices and to the normally de-energized output leads of the remaining two input devices; a seventh selector output line for concurrently exciting said first and second output units; and a seventh set of connections comprising three unilateral conducting elements respectively connecting to the normally de-energized output leads of said three input devices.

10. In combination; three input devices, each comprising a pair of output leads one being normally energized and the other normally de-energized, and an input lead adapted to receive stimuli for reversing the electrical states of said pair of output leads; first and second output units delivering an output signal upon excitation; first second and third selector output lines for exciting said first output unit; first second and third sets of connections each set comprising three resistor elements respectively connecting one of said first second and third selector output lines in differing combinations to the normally de-energized output lead of one of said input devices and to the normally energized output leads of the remaining two input devices; fourth fifth and sixth selector output lines for exciting said second output unit; fourth fifth and sixth sets of connections each set comprising three resistor elements respectively connecting one of said fourth, fifth and sixth selector output lines in differing combinations to the normally energized output lead of one of said input devices and to the normally de-energized output leads of the remaining two input devices; a seventh selector output line for concurrently exciting said first and second output units; and a seventh set of connections comprising three resistor elements respectively connecting to the normally de-energized output leads of said three input devices.

11. In combination; three input devices, each comprising a pair of output leads one being normally energized and the other normally de-energized, and an input lead adapted to receive stimuli for reversing the electrical states of said pair of output leads; first and second output units delivering an output signal upon excitation; a delay network delivering stimuli to the input lead of one of said input devices from said second output unit; first second and third selector output lines for exciting said first output unit; first second and third sets of connections each set comprising three resistor elements respectively connecting one of said first second and third selector output lines in differing combinations to the normally de-energized output lead of one of said input devices and to the normally energized output leads of the remaining two input devices; fourth fifth and sixth selector output lines for exciting said second output unit; fourth fifth and sixth sets of connections each set comprising three resistor elements respectively connecting one of said fourth, fifth and sixth selector output lines in differing combinations to the normally energized output lead of one of said input devices and to the normally de-energized output leads of the remaining two input devices; a seventh selector output line for concurrently exciting said first and second output units; and a seventh set of connections comprising three resistor elements respectively connecting to the normally de-energized output leads of said three input devices.

12. In combination; three input devices, each comprsing a pair of output leads one being normally energized and the other normally de-energized, and an input lead adapted to receive stimuli for reversing the electrical states of said pair of output leads; first and second conditioned output units delivering an output signal upon excitation; a signal source conditioning said first and second output units; a delay network delivering stimuli to the input lead of one of said input devices from said second output unit; first second and third selector output lines for exciting said first output unit; first, second and third sets of connections each set comprising three elements respectively connecting one of said first second and third selector output lines in differing combinations to the normally de-energized output lead of one of said input devices and to the normally energized output leads of the remaining two input devices; fourth fifth and sixth selector output lines for exciting said second output unit; fourth fifth and sixth sets of connections each set comprising three elements respectively connecting one of said first second and third selector output lines in differing combinations to the normally energized output lead of one of said input devices and to the normally de-energized output leads of the remaining two input devices; a seventh selector output line for concurrently exciting said first and second output units; and a seventh set of connections comprising three elements respectively connecting to the normally de-energized output leads of said three input devices.

13. In signalling apparatus; first, second and third input members; first and second output members; a first electric network delivering a signal to said first output member in response to excitation of any one of said input members and not delivering a signal to either of said output members in the presence of excitation of more than one of said input members; a second electric network delivering a signal to said second output member in response to excitation of any two of said input members and not delivering a signal to either of said output members in the presence of excitation of more or less than two of said input members; and a third electric network delivering a signal to said first and second output members in response to excitation of all of said input members.

14. In signalling apparatus; first, second and third input members; first and second output members; a first electric network delivering a signal to said first output member in response to excitation of any one of said input members and not delivering a signal to either of said output members in the presence of excitation of more than one of said input members; a second electric network delivering a signal to said second output member in response to excitation of any two of said input members and not delivering a signal to either of said output members in the presence of excitation of more or less than two of said input members; a third electric network delivering a signal to said first and second output members in response to excitation of all of said input members; and a connection between said second output member and one of said input members.

15. In signalling apparatus; first, second and third input members; first and second output members; a first electric network delivering a signal to said first output member in response to excitation of any one of said input members and not delivering a signal to either of said output members in the presence of excitation of more than one of said input members; a second electric network delivering a signal to said second output member in response to excitation of any two of said input members and not delivering a signal to either of said output members in the presence of excitation of more or less than two of said input members; a third electric network delivering a signal to said first and second output members in response to excitation of all of said input members; and a delay element connected between said second output member and one of said input members.

JOHN PRESPER ECKERT, JR.
JOHN W. MAUCHLY.

REFERENCES CITED

The following references are of record in the file of this patent:

UNITED STATES PATENTS

| Number | Name | Date |
|---|---|---|
| 2,266,779 | Loughridge et al. | Dec. 23, 1941 |
| 2,468,112 | Rosen | Apr. 26, 1949 |

OTHER REFERENCES

Calculating Instruments and Machines by Douglas R. Hartree; published 1949 by the University of Illinois Press, pages 97–103.